US012414620B1

(12) United States Patent
Skelton

(10) Patent No.: US 12,414,620 B1
(45) Date of Patent: Sep. 16, 2025

(54) LOTION APPLICATOR

(71) Applicant: Jackie D. Skelton, La Grange, TX (US)

(72) Inventor: Jackie D. Skelton, La Grange, TX (US)

( * ) Notice: Subject to any disclaimer, the term of this patent is extended or adjusted under 35 U.S.C. 154(b) by 0 days.

(21) Appl. No.: 19/082,972

(22) Filed: Mar. 18, 2025

Related U.S. Application Data

(60) Provisional application No. 63/566,590, filed on Mar. 18, 2024.

(51) Int. Cl.
*A46B 5/02* (2006.01)
*A45D 40/26* (2006.01)
*B25G 1/10* (2006.01)
*B25G 3/20* (2006.01)

(52) U.S. Cl.
CPC ........... *A45D 40/261* (2013.01); *B25G 1/102* (2013.01); *B25G 3/20* (2013.01); *A45D 2200/1081* (2013.01); *A61H 2201/0153* (2013.01); *A61H 2201/105* (2013.01); *A61H 2201/1635* (2013.01); *A61H 2205/081* (2013.01)

(58) Field of Classification Search
CPC .......... A45D 40/261; A45D 2200/1081; B25G 1/102; B25G 3/20; A61H 2201/0153; A61H 2201/105; A61H 2201/1635; A61H 2205/081
See application file for complete search history.

(56) References Cited

U.S. PATENT DOCUMENTS 7,309,180 B2 12/2007 Russell et al.
8,715,252 B2 * 5/2014 Connor ............... A61M 35/003 604/289
9,138,043 B1 * 9/2015 Meier .................... A45D 34/04
9,597,488 B1 * 3/2017 Jones ....................... B25G 1/10
11,122,880 B1 * 9/2021 Blackner ................ A45D 34/04
11,291,814 B1 * 4/2022 Swier ..................... B25G 1/102
11,752,614 B2 * 9/2023 Cariello ................. B25G 1/102 16/429
11,897,152 B2 * 2/2024 Niles ................... B26B 19/3853
2018/0160865 A1 6/2018 Richards
2022/0115682 A1 4/2022 Allinson et al.

* cited by examiner

*Primary Examiner* — Jennifer C Chiang
(74) *Attorney, Agent, or Firm* — HULSEY P.C.

(57) ABSTRACT

A lotion applicator for applying a lotion or skincare product to hard-to reach portions of the body is disclosed. The lotion applicator includes a handle or elongated rod. The handle includes a jaw-like structure or clamp capable of releasably holding a roll-on lotion or bottle containing lotion, soap, gel, pain relief lotion, personal care product, cleaning agent, cosmetics and the like. The clamp presents a first part and a second part forming a receptacle for holding the roll-on lotion. The length of the handle is adjustable allowing a user of the lotion applicator to reach the entire area of the back of the user and apply the lotion.

16 Claims, 3 Drawing Sheets

LOTION APPLICATOR

CROSS-REFERENCE TO RELATED APPLICATIONS

The present application claims priority to U.S. Provisional Application No. 63/566,590, filed Mar. 18, 2024, all of which is incorporated herein in its entirety and referenced thereto.

FIELD OF THE INVENTION

The present subject matter generally relates to an applicator. More particularly, the present subject matter relates to a lotion applicator for applying lotion, soap and the like on a body of a user.

BACKGROUND OF THE INVENTION

Individuals face a common challenge when applying lotion, sunscreen, other topical skincare products or soap to the back and hard-to reach portions of the body. The back is a large and hard-to-reach area, making self-application cumbersome, ineffective and often resulting in uneven coverage or missed spots.

Traditional methods of applying lotion to the back involve awkward manoeuvres, such as reaching over the shoulder or attempting to contort the arm and hand to reach the desired area. These methods are often ineffective, leading to frustration and potentially reducing the effectiveness of the skincare product. Additionally, the reliance on assistance from others can be inconvenient and may not always be available.

Various lotion/soap applicator devices exist in the market, ranging from simple elongated handles with sponge or cloth attachments to more complex mechanisms with extendable arms and rotating heads.

One such example is disclosed in a U.S. Pat. No. 7,309,180, entitled “Multipurpose hygienic implement” (“the ’180 patent”). The ’180 patent discloses a combination back scratcher, washer, lotion warmer and applicator includes an elongated, hollow ergonomically designed shaft having a handle at an upper end and any one of a plurality of interchangeable pivotal heads at the lower end. A heated lotion tube is received within the shaft. A reciprocal trigger operates an air pump to deliver heated lotion from the tube to one of the interchangeable heads.

Another example is disclosed in a Korean Publication No. 20220115682, entitled “Apparatus for Skin Care” (“the ’682 Publication”). The ’682 Publication discloses a skincare apparatus including a head unit and a handle unit. The skincare apparatus comprises: a brush part provided in the head unit to apply a skincare solution such as lotion to the skin; a storage container in which the skincare solution is stored and which is detachably coupled to the brush part; the handle unit provided on one side of the head unit to be grippable by a user; and a button provided on the handle unit to perform an opening and closing function for a solution ejection operation. The storage container of the head unit has a connection hole through which the solution comes out. The brush part has an ejection hole formed therein to eject the solution coming out through the connection hole. Accordingly, the skincare apparatus enables lotion or the like to be easily applied to the skin of a body part that is difficult for the hand to reach, so that various users of all ages and genders can easily use the same alone.

Another example is disclosed in a United States Publication No. 20180160865, entitled “Liquid application assembly” (“the ’865 Publication”). The ’865 Publication discloses a liquid application assembly having interchangeable head members designed to perform a predetermined function, releasably attached it to a distal end of a main body member, insert a chosen liquid into an interior volume of the main body member, attach a cap member to a proximal end of an elongated tube member, and activate a pump member to thereby force the liquid into a contact portion of the chosen interchangeable head member to then apply the liquid to the skin of the user using via the contact portion.

Although the above discussed applicators are useful, many of them have limitations in terms of effectiveness, ease of use, and portability.

Therefore, there is a need in the art to provide an improved lotion/soap applicator specifically designed to address the challenges associated with applying skincare products including soap and the like to the back. Such an applicator should be easy to use, providing efficient coverage without requiring excessive effort or coordination. It should also be adaptable to different types of lotions and creams, as well as being comfortable and ergonomic for the user.

SUMMARY OF THE INVENTION

It is one of the main objects of the present subject matter to provide an apparatus or a lotion applicator or a pain lotion applicator for applying lotion or other skin products to the back or hard-to-reach portions of the body of an individual.

It is another object of the present subject matter to ease the applicability of skincare products or lotions to hard-to-reach portions of the body of the individual.

It is another object of the present subject matter to provide a lotion applicator configured to hold a variety of tubes of skincare products or pain relievers.

In order to overcome the limitations here stated, the present subject matter provides a lotion applicator. The lotion applicator includes a handle or elongated rod. The handle includes a jaw-like structure or clamp capable of releasably holding lotion, soap, gel, pain relief lotion, personal care product, cleaning agent, cosmetics and the like. In one example, the lotion comes in the form of a roll-on lotion. The jaw-like structure presents a first part and a second part forming a receptacle for holding the lotion. The length of the handle is adjustable allowing a user of the lotion applicator to reach the entire area of the back of the user.

In one advantageous feature of the present subject matter, the lotion applicator holds the roll-on lotion or a bottle containing the skincare products or pain relievers and makes it easy to apply to the back and shoulders. The user holds the handle in order to reach his/her back to rub on the lotion without assistance. The roll-on lotion connects to the lotion applicator at the top i.e., at the clamp. The lotion applicator offers a handheld lotion applicator for applying lotion or soap to hard-to reach portions of the body.

In one advantageous feature of the present subject matter, the jaw-like structure or clamp is adjustable to fit the roll-on lotion of various shapes and sizes. The jaw-like structure presents an adjustable clamp allowing it to easily connect and remove the roll-on lotion from the lotion applicator.

Features and advantages of the subject matter hereof will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

With the above and other related objects in view, the subject matter consists in the details of construction and combination of parts as will be more fully understood from the following description, when read in conjunction with the accompanying drawings in which.

DETAILED DESCRIPTION OF THE INVENTION

The following detailed description set forth below in connection with the appended drawings is intended as a description of exemplary embodiments in which the presently disclosed subject matter may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed lotion applicator. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed lotion applicator.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present subject matter encompasses present and future known equivalents to the known components referred to herein by way of illustration.

Although the present subject matter provides a description of a lotion applicator, it is to be further understood that numerous changes may arise in the details of the embodiments of the lotion applicator. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

Various features and embodiments of a lotion applicator for application of lotion or skincare products are explained in conjunction with the description of FIGURES FIGS. 1-7.

Figure 1:
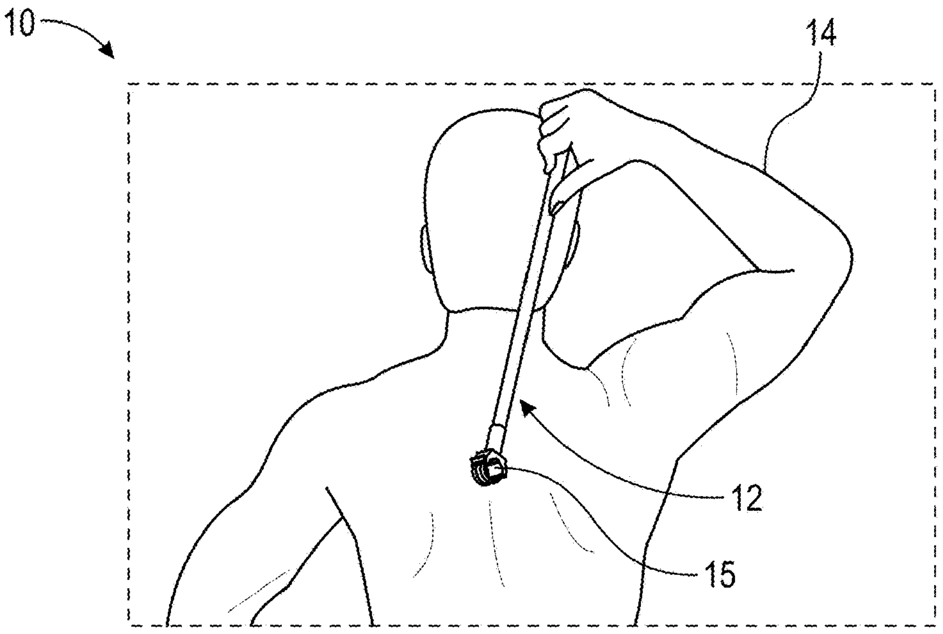
FIG. 1 illustrates an environment in which a lotion applicator implements, in accordance with one embodiment of the present subject matter.

FIG. 1 shows an environment 10 of a lotion applicator 12 being used by a user 14, in accordance with one exemplary embodiment of the present subject matter. Lotion applicator 12 holds a roll-on lotion 15 and enables user 14 to access back or hard-to-reach portions of the body of user 14 and apply skincare products, pain relievers, etc. Roll-on lotion 15 indicates lotion, pain reliever, soap, gel, pain relief lotion, personal care product, cleaning agent, cosmetics and the like contained within a tube or squeezable container. In one example, roll-on lotion 15 comes in a bottle configuration.

Figure 2:
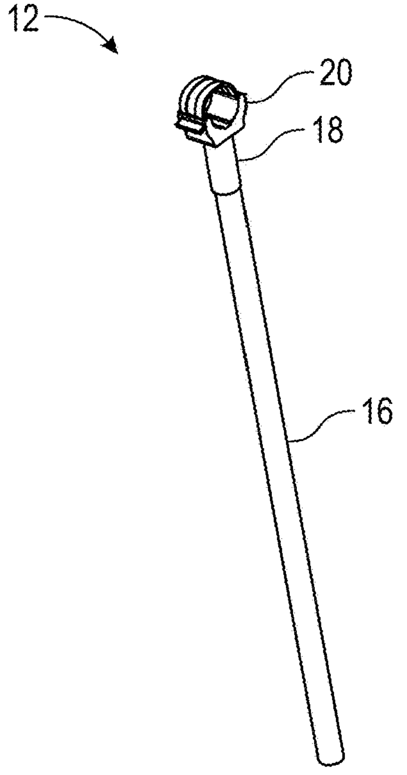
FIG. 2 illustrates a perspective view of the lotion applicator, in accordance with one embodiment of the present subject matter.
Figure 3:
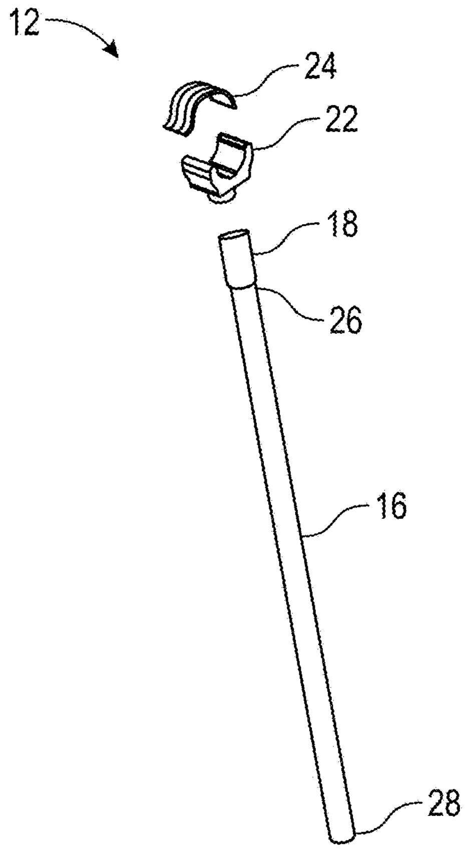
FIG. 3 illustrates an exploded view of the lotion applicator, in accordance with one embodiment of the present subject matter.

FIG. 2 and FIG. 3 show a perspective view and an exploded view, respectively of lotion applicator 12, in accordance with one embodiment of the present subject matter. Lotion applicator 12 includes a handle 16. Handle 16 indicates an elongated bar made up of plastic, wood, metal or any other suitable material. In one example, handle 16 comes in a telescopic configuration (an inner tube and an outer tube) allowing it to adjust the length depending on the need. Handle 16 has a first end 26 and a second end 28. Second end 28 indicates a distal end of handle 16. In one example, handle 16 is rotated to adjust the length of handle 16, i.e., distance between first end 26 and second end 28. At first end 26, handle 16 includes a connecting member 18. Connecting member 18 configures to receive a clamp 20 or jaw-like structure. In one example clamp 20 removably connects to handle 16 via connecting member 18.

Figure 4:
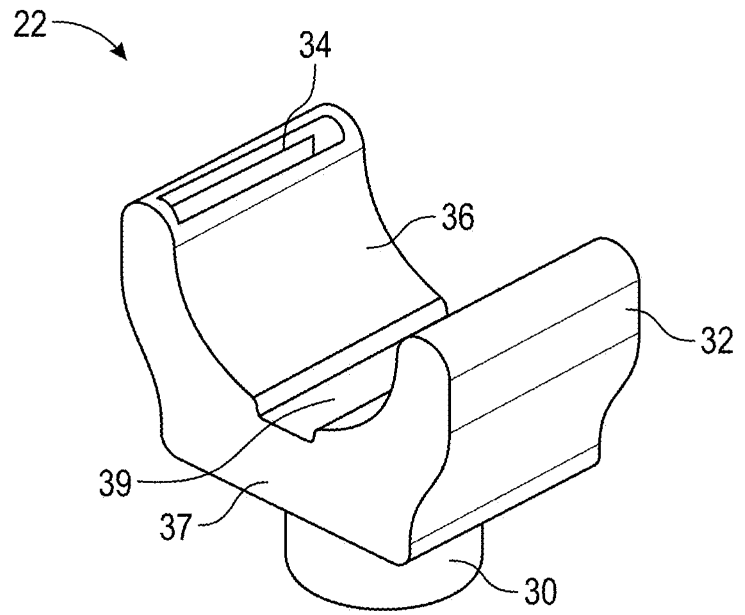
FIG. 4 illustrates a first part of a jaw-like structure or clamp, in accordance with one embodiment of the present subject matter.

Clamp 20 includes a first part 22 and a second part 24, each made up of metal, plastic, wood or any other suitable material. First part 22 indicates a lower jaw and second part 24 indicates an upper jaw. FIG. 4 shows a perspective view of first part 22, in accordance with one embodiment of the present subject matter. First part 22 includes a neck portion 30. Here, neck portion 30 has a slightly smaller diameter than connecting member 18 allowing neck portion 30 to snugly fit into connecting member 18. First part 22 includes a rectangular portion 37. Further, first part 22 has a first U-shaped member 32 extending from rectangular portion 37. In one example, rectangular portion 37 has an elongated notch 39 for providing grip to hold roll-on lotion 15 in place. At one distal end, first U-shaped member 32 includes a slit 34. First U-shaped member 32 forms a first semi-circular opening 36 for receiving roll-on lotion 15.

Figure 5:
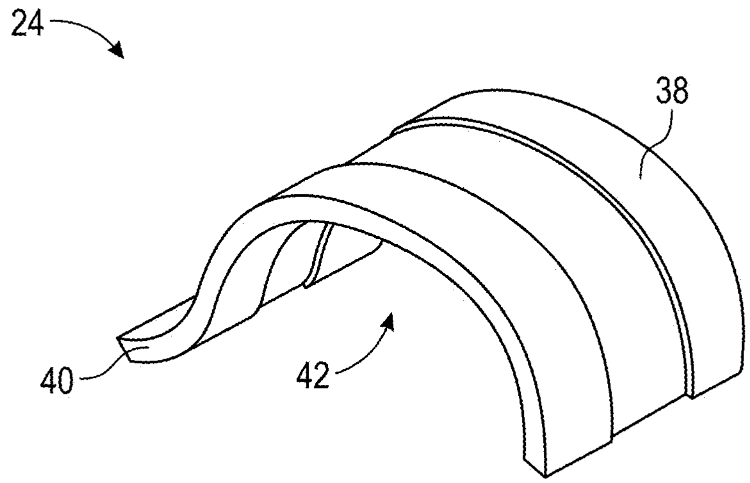
FIG. 5 illustrates a second part of the clamp, in accordance with one embodiment of the present subject matter.

FIG. 5 shows a perspective view of second part 24, in accordance with one embodiment of the present subject matter. Second part 24 presents a second U-shaped member 38. Second U-shaped member 38 has a jaw connecting tip 40. Jaw connecting tip 40 extends from the distal end of second U-shaped member 38. Second U-shaped member 38 presents a second semi-circular opening 42. In one example, second U-shaped member 38 connects to first U-shaped member 32 via a hinge 44.

Figure 6:
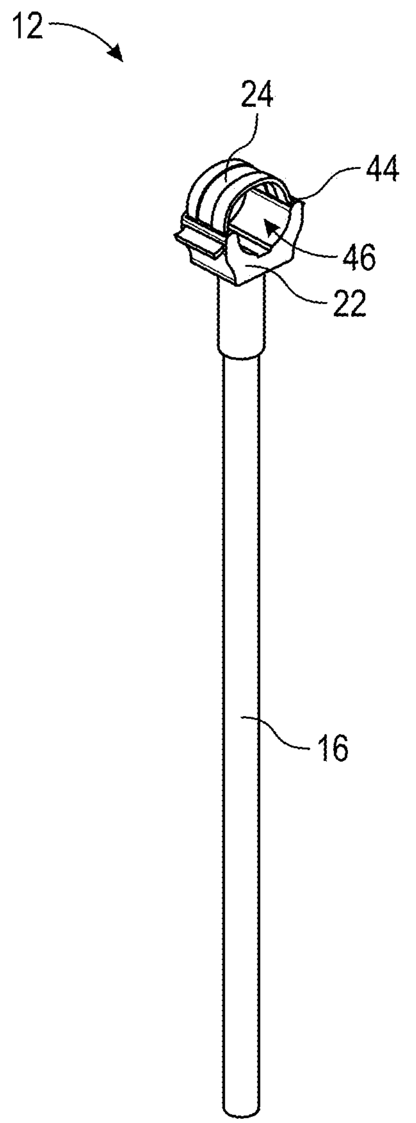
FIG. 6 illustrates the feature of a receptacle formed at the jaw-like structure in a closed configuration, in accordance with one embodiment of the present subject matter.
Figure 7:
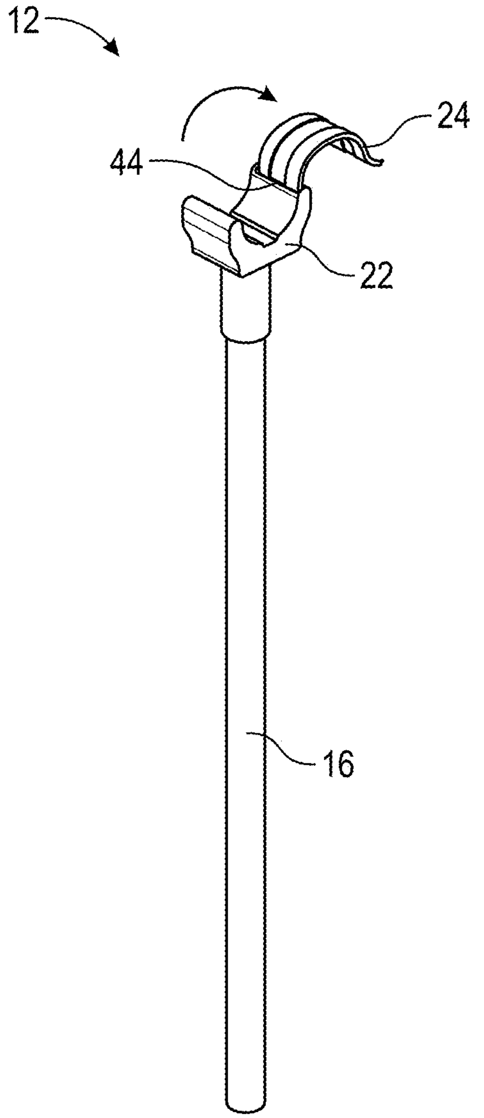
FIG. 7 illustrates the feature of the jaw-like structure in an open configuration, in accordance with one embodiment of the present subject matter.

In accordance with the present subject matter, second U-shaped member 38 folds over first U-shaped member 32 to form a receptacle 46 (with first semi-circular opening 36 and second semi-circular opening 42) for holding roll-on lotion 15, as shown in FIG. 6. Here, jaw connecting tip 40 inserts in slit 34 formed at first U-shaped member 32 to lock second U-shaped member 38 over first U-shaped member 32. When needed, jaw connecting tip 40 is disengaged from slit 34 and lifted over to remove roll-on lotion 15 from clamp 20, as shown in FIG. 7.

In use, user 14 lifts up second U-shaped member 38 and places roll-on lotion 15 in receptacle 46. Subsequently, user 14 inserts jaw connecting tip 40 in slit 34 to connect second part 24 to first part 22. Subsequently, user 14 holds handle 16 and rubs roll-on lotion 15 to apply lotion or soap to hard-to-reach portions of the body. In one example, user 14 holds handle 16 and positions lotion applicator 12 at his back to apply lotion at his/her back as shown in FIG. 1.

The presently disclosed lotion applicator provides several advantages over the prior art. The lotion applicator provides a handheld device to apply a lotion to relieve pain to the back or other hard to reach areas. The lotion applicator has about a three-feet handle with a clamp for holding the bottle containing the lotion. The lotion applicator is lightweight and is easy to use with simple clamp design for holding the roll-on lotion. The lotion applicator helps to apply pain relieving lotion or soap to hard-to-reach areas over the body and prevents the user from needing help from other individuals.

A person skilled in the art appreciates that the lotion applicator may come in a variety of shapes and sizes depending on the need and comfort of the user. Further, many changes in the design and placement of components may take place without deviating from the scope of the presently disclosed lotion applicator.

In the above description, numerous specific details are set forth such as examples of some embodiments, specific components, devices, methods, in order to provide a thorough understanding of embodiments of the present subject matter. It will be apparent to a person of ordinary skill in the art that these specific details need not be employed, and should not be construed to limit the scope of the subject matter.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the subject matter, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed subject matter.

What is claimed is:

1. A lotion applicator, comprising:
- a handle; and
- a clamp comprising a first part and a second part, wherein said first part connects to said handle, wherein said first part comprises a slit, wherein said slit positions at a distal end of said first part, wherein said second part comprises a jaw connecting tip, wherein said second part folds over said first part to form a receptacle to hold a roll-on lotion, and wherein said jaw connecting tip inserts in said slit to secure said roll-on lotion in said receptacle.

2. The lotion applicator of claim 1, wherein said handle has a telescopic configuration enabling height adjustment.

3. The lotion applicator of claim 1, further comprises a connecting member, wherein said connecting member connects to said handle and said first part of said clamp.

4. The lotion applicator of claim 3, wherein said first part comprises a neck portion configured to fit into said connecting member.

5. The lotion applicator of claim 1, wherein said second part connects to said first part via a hinge.

6. The lotion applicator of claim 1, wherein said jaw connecting tip disengages from said slit to remove said roll-on lotion.

7. The lotion applicator of claim 1, wherein said first part comprises a first U-shaped member, and said second part comprises a second U-shaped member.

8. The lotion applicator of claim 7, wherein said first U-shaped member comprises an elongated notch configured to grip said roll-on lotion.

9. The lotion applicator of claim 1, wherein said roll-on lotion comprises one of a soap, gel, pain relief lotion, personal care product, cleaning agent, and cosmetics.

10. A lotion applicator, comprising:
- a handle, wherein said handle has a telescopic configuration enabling height adjustment; and
- a clamp comprising a first part and a second part, wherein said first part connects to said handle, wherein said first part comprises a slit at one distal end and a hinge at other distal end, wherein said second part comprises a jaw connecting tip at a distal end, wherein said second part connects to said first part via said hinge, wherein said second part folds over said first part to form a receptacle to hold a roll-on lotion, and wherein said jaw connecting tip inserts in said slit to secure said roll-on lotion in said receptacle.

11. The lotion applicator of claim 10, further comprises a connecting member, wherein said connecting member connects to said handle and said first part of said clamp.

12. The lotion applicator of claim 11, wherein said first part comprises a neck portion configured to fit into said connecting member.

13. The lotion applicator of claim 10, wherein said jaw connecting tip disengages from said slit to remove said roll-on lotion.

14. The lotion applicator of claim 10, wherein said first part comprises a first U-shaped member, and said second part comprises a second U-shaped member.

15. The lotion applicator of claim 14, wherein said first U-shaped member comprises an elongated notch configured to grip said roll-on lotion.

16. The lotion applicator of claim 10, wherein said roll-on lotion comprises one of a soap, gel, pain relief lotion, personal care product, cleaning agent, and cosmetics.

* * * * *